United States Patent [19]
Mills

[11] Patent Number: 5,253,668
[45] Date of Patent: Oct. 19, 1993

[54] SMOOTH-OPENING, LOW-HYSTERESIS BALL HEAD VALVE

[75] Inventor: Vaughn Mills, Ann Arbor, Mich.

[73] Assignee: G.T. Products, Inc., Ann Arbor, Mich.

[21] Appl. No.: 18,815

[22] Filed: Feb. 18, 1993

[51] Int. Cl.⁵ .............................................. F16K 15/04
[52] U.S. Cl. ................................... 137/12; 137/513.5; 137/587; 220/746
[58] Field of Search ............ 137/43, 12, 513.3, 513.5, 137/513.7, 587; 220/746

[56] References Cited
U.S. PATENT DOCUMENTS 3,062,525 11/1962 Shutmaat ..................... 137/513.5 X
4,760,858 8/1988 Szlaga ................................. 137/43

Primary Examiner—Robert G. Nilson
Attorney, Agent, or Firm—Krass & Young

[57] ABSTRACT

A smooth-opening, low hysteresis, pressure-operated ball head valve connected between a fuel tank and vapor trap in a vehicle fuel system for providing smooth, two-stage, low hysteresis vapor flow. The ball valve element is positioned within a cylindrical retainer in the valve body, and the dimensions of the various valve orifices and the geometry of the retainer are determined in view of a specified lift off pressure and ball weight to achieve these flow characteristics.

4 Claims, 2 Drawing Sheets

SMOOTH-OPENING, LOW-HYSTERESIS BALL HEAD VALVE

FIELD OF THE INVENTION

The invention relates to head valves for maintaining specified pressure heads in storage tanks for volatile fluids and the like. Specifically, the invention relates to ball-type head valves for vehicle fuel tanks.

BACKGROUND OF THE INVENTION

It is well known in the vehicle fuel system art to maintain a specific vapor pressure head within the vapor space of a fuel tank during refueling to prevent over filling of the fuel tank. Vapor pressure increases due to ambient temperature change, or the heating of the fuel during operation of the vehicle, require controlled venting of vapor from the fuel tank.

A frequently employed device is the ball-type head valve connected between the fuel tank and a vapor trap such as a carbon canister. In this type of valve a weighted ball normally sits on a valve seat to limit vapor venting from the tank and thereby build up and maintain a specified head pressure. The ball is responsive to certain conditions, either excess vapor pressure in the fuel tank or vehicle movement, to unseat and vent vapor from the fuel tank to the vapor trap. The ball valve is often calibrated or balanced by spring structure.

U.S. Pat. No. 4,760,858 to Szlaga discloses a ball head valve contained within a cup-shaped retainer and normally resting on a valve seat to block vapor venting from the fuel tank. The ball is held very loosely by the cup-shaped retainer to permit substantial movement or rattling of the ball valve off the valve seat when the vehicle is in motion. When the vehicle is stationary, the ball valve opens only in response to excess vapor pressure in the fuel tank. When the vehicle is in motion, the ball continuously vibrates off the valve seat within the loosely-toleranced cup-shaped retainer to intermittently bleed vapor from the fuel tank and reduce the effective head pressure therein.

U.S. Pat. No. 4,666,058 to Harris discloses a ball valve contained within a cup-shaped retainer depending from the cap on the end of a vehicle filler pipe. The cup-shaped retainer has a plurality of vent holes formed about the periphery of the retainer above the normal resting position of the ball. A vent outlet is formed in the top of the retainer above the peripheral vent holes. When the vehicle is upright the valve is normally open, with the ball valve resting below the radial vents to permit fuel vapor to flow out the vent outlet at the top of the retainer. The location of the vent holes above the ball prevent its being prematurely closed by a vapor pressure from the fuel tank; i.e., the ball is only affected by liquid level or rollover orientation.

Numerous other patents disclose pressure- or movement-operated ball-type head valves: U.S. Pat. No. 1,893,942 to Jensen; U.S. Pat. No. 3,738,384 to Hall; U.S. Pat. No. 4,392,507 to Harris; U.S. Pat. No. 4,416,108 to Ghandhi; U.S. Pat. No. 4,457,325 to Green; U.S. Pat. No. 4,736,863 to Harris; and U.S. Pat. No. 4,779,755 to Harris.

The vapor trap carbon canisters in modern vehicle fuel systems frequently become partially saturated with fuel vapor and must be purged to the vehicle manifold to restore their effectiveness. The purged fuel vapor is burned off by the engine. Experience has shown that prior art head valves, including ball-type head valves, have an adverse effect on engine performance. Movement-operated, rattle-type valves are likewise unsuitable for use as a primary head valve. Prior art pressure-operated valves tend to blast open and snap closed in an abrupt fashion, resulting in either a sudden charge of fuel rich vapor to the manifold, or a sudden decrease in the vapor being supplied to the manifold. This sudden increase or decrease in supplied fuel vapor during the purge cycle causes undesirable engine roughness or "stumble".

However, ball head valves do possess the advantage of being mechanically simple and reliable. It is therefore desirable to improve the vapor flow characteristics of the ball-type pressure-responsive head valve to eliminate the purge cycle problems associated with them.

SUMMARY OF THE INVENTION

The present invention is an improved, smooth-opening, low hysteresis, pressure-operated ball head valve supplying smooth, two-stage vapor flow from a vehicle fuel tank to the vapor trap. The valve generally comprises a valve body connected between the vehicle fuel tank and the vapor trap, with a vapor vent outlet in direct communication with the interior of the fuel tank, a circular valve seat on which rests a ball of known weight and diameter, a cylindrical retainer closely fitting around the ball, a valve chamber around the retainer and ball and a canister port leading from the valve chamber to the vapor trap. Radial vents are formed in the cylindrical retainer, and a small bleed orifice is formed in the valve seat to bypass the ball.

Below a specified pressure, the ball rests on the valve seat to close all but the bleed orifice, which slowly bleeds fuel vapor in continuous fashion to the canister at a first low volume flow. When vapor pressure in the fuel tank reaches a predetermined pressure, the ball lifts smoothly off the valve seat to increase the volume of flow to the vapor trap.

The vapor flow/pressure curve of the ball valve of the present invention is characterized by smooth two-stage flow: relatively low flow at low pressures, an increase flow with a smooth but rapid increase in the slope of the flow curve at a specified pressure, and then flow controlled by an orifice that is larger than the bleed orifice. When pressure is decreased the decreasing flow curve tracks the increasing flow curve closely, with a minimum of hysteresis when descending through the high flow to low flow point.

This two-stage flow is achieved by carefully calibrating the various flow orifices and outlets. The critical diameters are the diameter of the valve seat, the diameter of the radial vent holes, the diameter of the retainer, the diameter of the vent outlet from the tank, the height of the retainer, the height of ball travel off the valve seat, and, to a lesser extent, the flow rate of the bleed orifice.

In general, the diameter of the valve seat is a function of the weight of the ball and the specified lift or head pressure. The diameter of the radial vent holes is a function of the diameter of the valve seat. The diameter of the retainer should closely match the diameter of the ball, being only slightly larger. The diameter of the vent outlet is determined by the desired high flow rate. The height of the retainer is dependent on the ball diameter and the valve seat diameter. The ball travel height should be limited such that at the ball's highest position the centerline of the ball rises no higher than the height of the retainer. Finally, the bleed orifice is determined by the desired low flow rate.

Empirically-determined equations for determining the above dimensions are set forth below. These and other features of the present invention will be apparent from further reading of the specification.

DETAILED DESCRIPTION OF THE DRAWINGS

Figure 1:
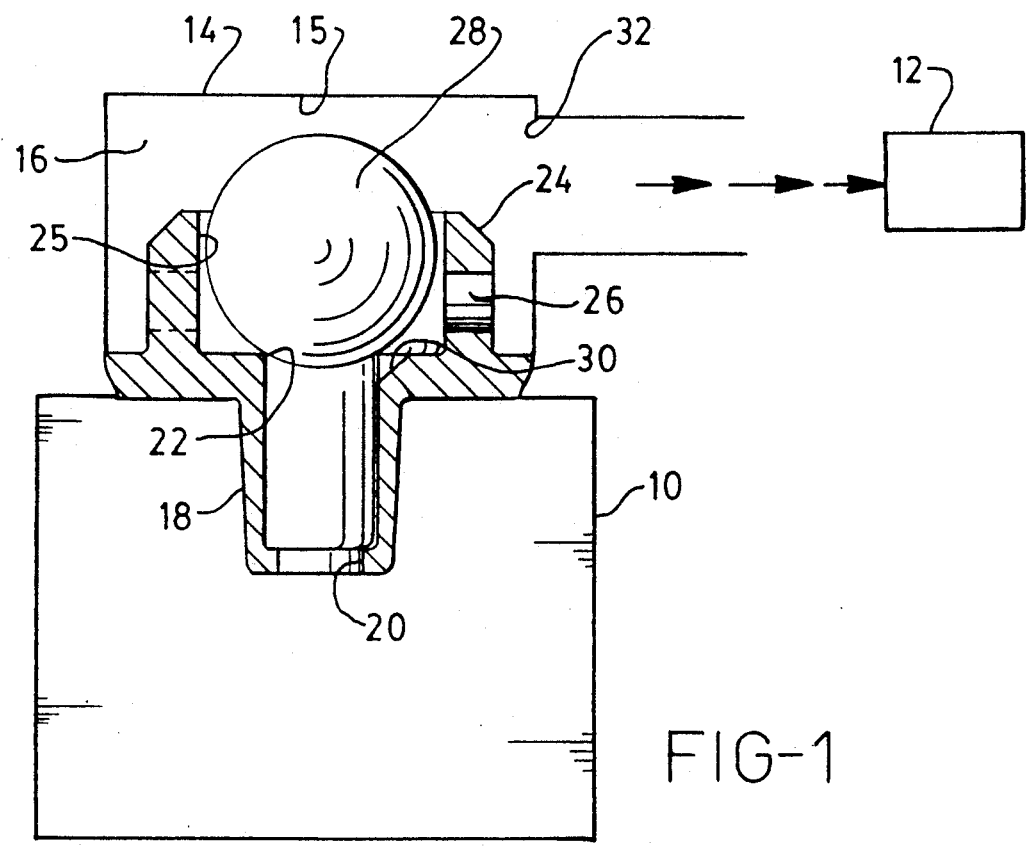
FIG. 1 is a side section view of a ball head valve according to the present invention, mounted on a fuel tank to selectively communicate with a vapor canister.

Referring to FIG. 1, a portion of a vehicle fuel system is schematically shown as comprising fuel tank 10 communicating with a vapor trap 12 such as a carbon canister. The carbon canister is periodically purged of stored fuel vapor to the vehicle manifold (not shown) in a well-known manner. An embodiment of the valve of the present invention is shown generally at 14, connecting the fuel tank and the vapor canister. Fuel vapor selectively flows from the fuel tank 10 through valve 14 to vapor trap 12, where it is stored and periodically purged to the manifold.

Valve 14 is preferably molded from a fuel-resistant plastic, and has a main valve chamber 16 and a lower body portion 18 extending into the fuel tank through an aperture formed in the tank wall. Structure for fastening valve 14 to the fuel tank in a fluid- and vapor-tight manner is shown, for example, in U.S. Pat. Nos. 4,960,153 and 5,083,583.

Figure 2:
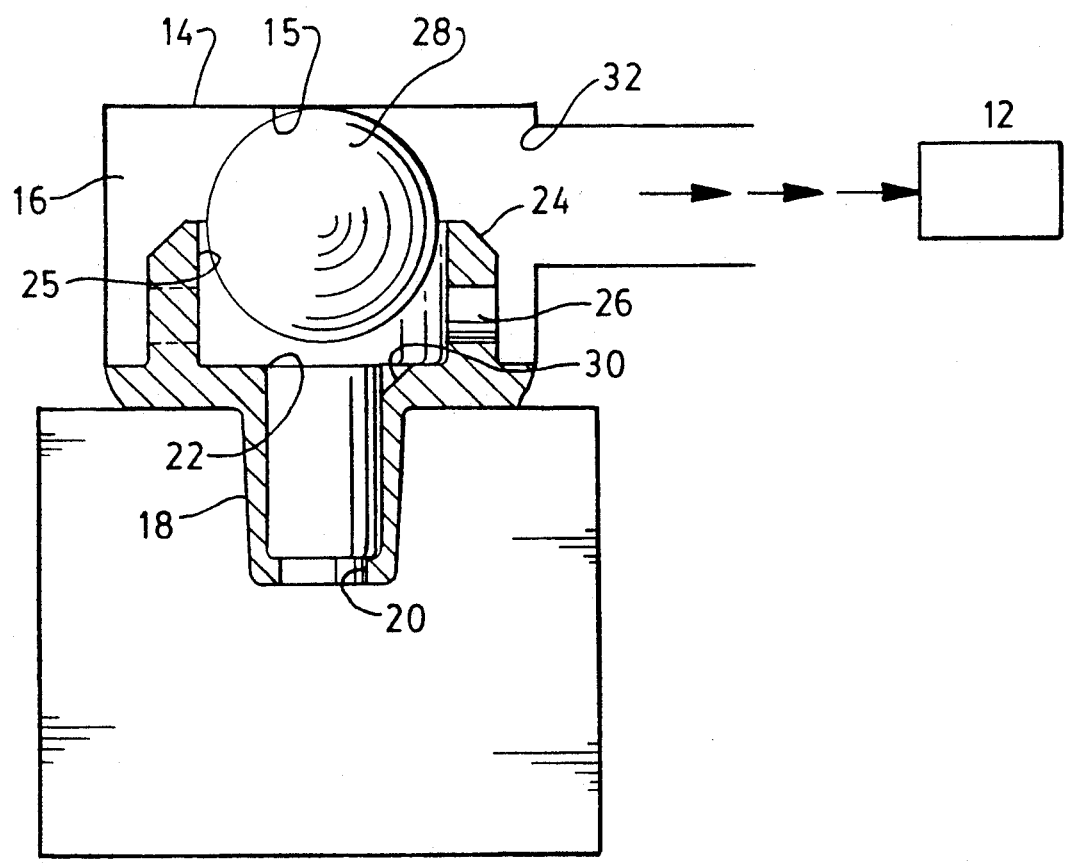
FIG. 2 shows the ball head valve of FIG. 1 in an open, high-flow condition.

A circular tank vent outlet 20 is formed in the lower end of lower body portion 18 to communicate fuel vapor from the fuel tank to valve chamber 16. A circular valve seat 22 is formed in the wall of lower body portion 18 between tank vent outlet 20 and valve chamber 16, and is surrounded by a cylindrical, cup-shaped retainer 24 comprising a continuous concentric, integral wall around valve seat 22. FIGS. 1 and 2 show two equally spaced radial vent holes 26 are formed in retainer 24. The product can have one or more holes. Radial vent holes 26 are also circular as shown—other shape holes can be used. Vent holes 26 are centered slightly below mid-height on retainer 24 for a purpose to be explained below.

A ball valve element 28 is seated within cup-shaped retainer 24 and normally rests on valve seat 22 as shown in FIG. 1. The diameter of ball 28 closely matches, but is slightly less than, the diameter of retainer 24. Only a slight gap exists between the surface of ball 28 and the interior surface 25 of retainer 24. In the illustrated embodiment ball 28 is made from stainless steel, but it will be understood by those skilled in the art that other materials may be used depending upon the desired operating characteristics of the valve.

A small bleed notch 30 is formed adjacent valve seat 22 to provide steady low-volume flow between tank vent outlet 20 and radial vent holes 26 positioned below the centerline of ball 28. The height of radial vent holes 26 on retainer 24 ensures that they are not blocked by ball 28 when it is resting on valve seat 22 in the valve closed position shown in FIG. 1. Finally, valve 14 includes a valve chamber outlet 32 connecting valve chamber 16 to the vapor trap 12.

Referring now to both FIGS. 1 and 2, ball valve element 28 is pressure-operated. As long as the pressure in fuel tank 10 is below a predetermined head pressure, the relatively heavy steel ball 28 rests on valve seat 22 to close the valve, permitting only low volume flow through bleed notch 30 out radial vents 26. When the pressure in tank 10 reaches or surpasses the given head pressure, ball 28 is forced off valve seat 22 to permit high volume vapor venting from tank vent outlet 20 through valve seat 22, radial vent holes 26 and the open bore of retainer 24. The height ball 28 is raised off valve seat 22 is determined by the velocity of the vapor acting on it from fuel tank 10, limited by top wall 15 of valve chamber 16. Ball 28 is maintained in axial alignment with valve seat 22 by retainer 24, since the height of valve chamber 16 is such that ball 28 never completely leaves retainer 24.

When pressure in fuel tank 10 decreases, ball 28 drops back onto valve seat 22 to shut off high volume flow and return to normal low volume flow through bleed notch 30.

Figure 3:
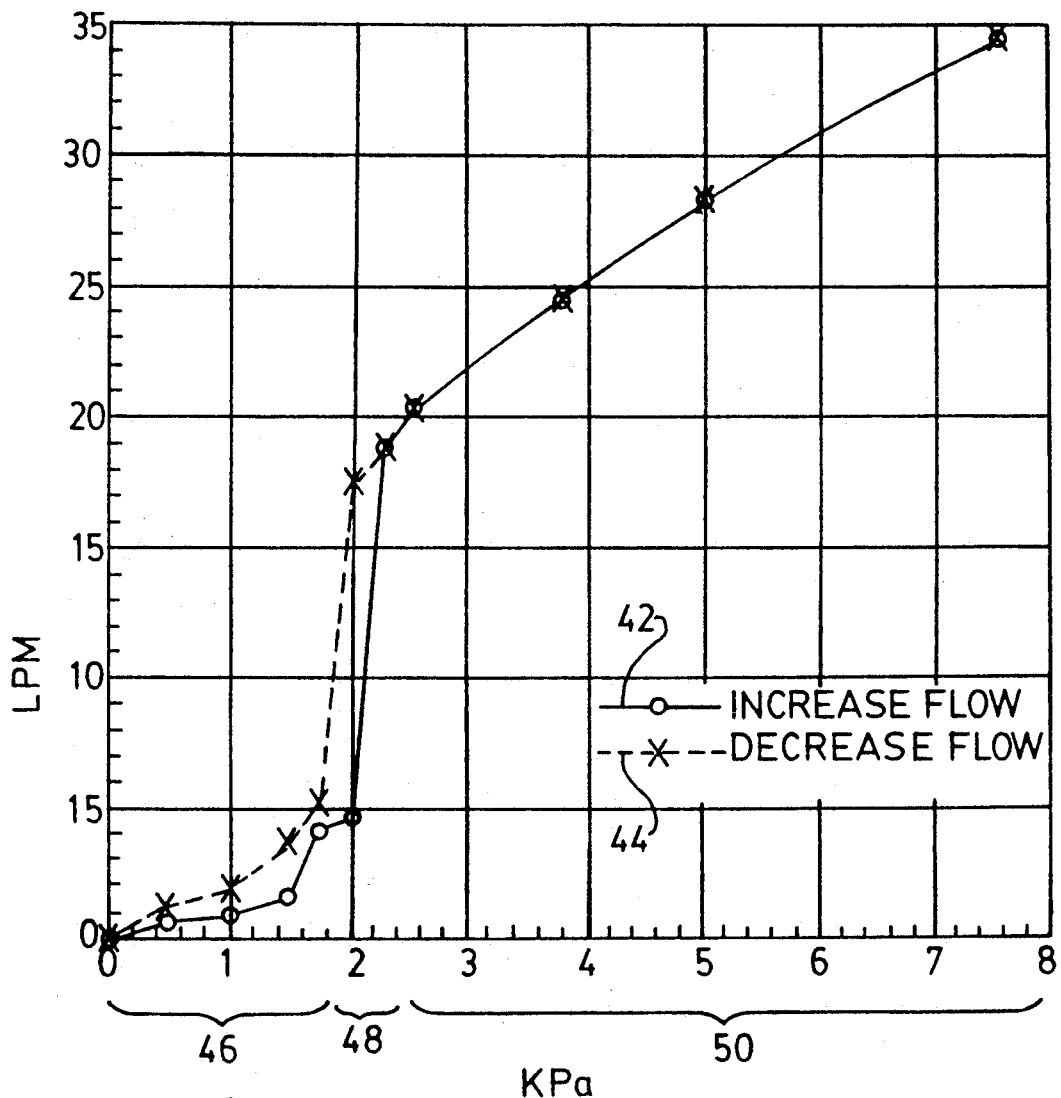
FIG. 3 is a flow versus vapor pressure graph showing the increasing and decreasing flow curves of one particular embodiment of the ball head valve of the present invention.

Referring now to FIG. 3, a vapor flow/pressure graph is shown describing an exemplary desired flow curve for the specific embodiment of the invention described in greater detail below. The vertical axis of the graph shows liters of fuel vapor flow per minute (LPM), while the horizontal axis of the graph shows vapor pressure in kilopascals (KPa).

The flow curve is characterized by an increasing flow curve shown in solid lines at 42, a decreasing flow curve shown in dotted lines at 44, a low flow region 46 generally between approximately 0 and 1.8 KPa, a transitional increase region 48 generally shown as a sharp increase in the slope of the curve between about 2.0 and 2.2 KPa from 5 LPM to approximately 18 LPM, and a high flow region 50 from about 2.2 KPa to approximately 7.6 KPa.

Low flow region 46 corresponds to the valve closed position shown in FIG. 1 where ball 28 rests on valve seat 22 and only low flow through bleed notch 30 occurs. The rate of flow increases gradually within low flow region 46 as the pressure increases.

At a specified head pressure, shown on the graph at approximately 1.8 to 2.0 KPa, the rate of flow increases dramatically at transitional region 48, with the slope of the curve being nearly vertical until the high flow region 50 is reached. This marks the initial lift-off of ball 28 from valve seat 22 when the given head pressure in tank is first exceeded. Although rapid, it is a smooth transition due to the ball-shaped valve element and the pressure-operated lift-off.

When flow reaches the high flow region 50, the slope of the curve again decreases to approximately that of the low flow region 46, in a nearly 1:1 fashion.

The foregoing description refers to the increasing flow curve 42 shown in solid lines. As pressure in the tank decreases, decreasing flow curve 44 exactly matches increasing flow curve 42 in the high flow region 50. In the transition region 48 corresponding approximately to the head pressure, a minimal hysteresis or lag is shown by the decreasing flow curve 44, since the sharp decrease in slope does not occur as pressure decreases until the initial head pressure is reached. The decreasing flow curve 44 flattens out again in low flow region 46, approximately matching increasing flow curve 42 in the same region, with only minimal hysteresis.

In other words, the rate of vapor flow decreases just as quickly as it increases in the high flow region 50; and it decreases at a rate slightly slower than the rate at which it increases in the transitional and low flow regions 48, 46. This minimal hysteresis has little if any effect on engine performance, particularly since it is confined to the transition and low flow regions.

Referring again to FIGS. 1 and 2, this desirable two-stage flow is achieved by carefully calibrating the various dimensions and flow orifices in the valve in view of a specified head pressure and a ball of known weight and diameter. The critical diameters are the diameter A of valve seat 22, the diameter B of the radial vent holes 26, the diameter C of retainer 24, the diameter D of vent outlet 20, the height E of the bore in retainer 24, the height F of ball travel off valve seat 22, and, to a lesser extent, the flow rate of bleed notch 30.

The diameter A of valve seat 22 is a function of the weight of ball 28 and the required head pressure P, using the equation:

$$A = \frac{\sqrt{4F}}{p\pi}$$

This is derived from the equation $$F = p\frac{\pi}{4}(A)^2$$

where $$F = \text{weight of ball 28} = \frac{(\text{weight in grams})}{453.6 \text{ g/lbs.}} = \text{force in lbs.}$$

$$p = \text{head pressure} = \frac{(\text{pressure in inches H}_2\text{O})}{27.68 \text{ inches H}_2\text{O/psi}} = \text{pressure in psi}$$

Accordingly, either of the head pressure P, the weight of ball 28 F, or the diameter A of valve seat 22 can be determined given the other two.

The diameter B of each of radial vent holes 26 is dependent on diameter A of valve seat 22 using the equation:

$$B = \sqrt{.35565 (A)^2}$$

This equation was determined empirically, and may vary slightly depending on the desired performance characteristics. This will be apparent to those skilled in the art.

While the illustrated embodiment shows two equally spaced radial vent holes 26, it is possible to provide retainer 24 with any number of equally spaced radial vent holes 26 so long as the air flow through the holes is equivalent to the air flow through two holes of diameter B. Those skilled in the art will be capable of determining the necessary diameter when more than two holes are used.

The diameter C of retainer 24 (the inner diameter defined by interior retainer wall 25) is dependent on the ball diameter. In the illustrated embodiment it is approximately 0.014 inches larger in diameter than the diameter of ball 28. However, it will be understood by those skilled in the art that diameter C of retainer 24 may vary for a given design. In determining the proper diameter, there are two primary considerations. First, if diameter C is too large ball 28 will spin in the bore of retainer 24 and not lift properly. Second, if diameter C is too small the ball will lift early and exhibit a large amount of hysteresis upon decreasing flow.

The height E of retainer 24 is dependent on the diameter of ball 28 and diameter A of valve seat 22, determined with the following relationship:

$$E = \frac{\sqrt{\left(\frac{\text{ball dia}}{2}\right)^2 - \left(\frac{\text{DIA } A}{2}\right)^2}}{.755}$$

This equation was also determined empirically. It is to be understood that very slight variations in the constant figures are likely to be within the scope of the invention, as design criteria may vary.

The ball travel height can vary depending on the desired performance characteristics. However, the travel height F should generally limit the travel of ball 28 such that at maximum lift the center line 29 of the ball rises no higher than the height E of retainer 24. This allows for the high volume flow required at higher pressures with a minimum of hysteresis on reverse flow. Additionally, the size and geometry of the valve chamber 16 surrounding the valve and the size of valve chamber outlet 32 both have an affect on ball travel height F.

Valve chamber outlet 32 must be larger than the diameter A of valve seat 22.

Bleed notch 30 can be calibrated to achieve low pressure flow as desired below the head pressure. Below the head pressure all of the vapor flow is through bleed notch 30. The size of the bleed notch will affect the head pressure. An increase in the bleed notch will cause an increase in the head pressure required to initially lift ball 28 off valve seat 22.

Diameter D of vent outlet 20 communicating with fuel tank 10 governs vapor flow at high pressures once the head pressure has been reached. The diameter D of vent outlet 20 is variable depending on the desired pressure curve during high pressure flow. It will generally not have significant effect on the other dimensions of the valve. The primary factor limiting diameter D of vent outlet 20 is the type of rollover valve float, if any, used. Specifically, high pressure flow may be limited if it causes partial aspiration of the float.

The foregoing description sets forth the structure and determining equations for making a pressure-responsive ball head valve which achieves two stage flow. Determinations of some of the critical dimensions require the use of fairly specific equations set forth above, while other dimensions are variable within certain general guidelines set forth above. It will be apparent to those skilled in the art where variations in structure and dimension lie within the general guidelines and the specific equations depending on the desired performance characteristics of the valve. The weight of the ball, the desired head pressure, the desired low pressure and high pressure flow characteristics lend themselves to minor experimentation in order to calibrate the entire valve. However, these changes are deemed to be within the scope of the appended claims.

I claim:

1. In a fuel system including a fuel tank connected to a vapor trap such as a carbon canister, a two-stage flow head valve for selectively venting fuel vapor from the fuel tank to the vapor trap, comprising:
- a hollow valve body connected to the interior of the fuel tank and the vapor trap;
- a circular valve seat in the valve body;
- a cylindrical retainer surrounding the valve seat;
- at least two equally spaced radial vents formed in the cylindrical retainer;
- a ball valve element having a rest position on the valve seat within the cylindrical retainer to close the valve seat;
- low flow vent means adjacent the valve seat within the cylindrical retainer for maintaining vapor flow from the tank around the ball valve element when it is in the rest position; wherein,
- the inner diameter of the cylindrical retainer is only slightly greater than the diameter of the ball valve element, and the radial vent holes are positioned below the center of the ball valve element when it is in the rest position.

2. In a vehicle fuel system comprising a fuel tank and a vapor trap for receiving fuel vapor from the fuel tank, a ball head valve connected between the fuel tank and the vapor trap to selectively vent fuel vapor from the tank to the trap, comprising:
- a hollow valve body having a fuel vapor inlet of a first area communicating with the interior of the fuel tank, a vent outlet of a second area communicating with the vapor trap;
- a circular valve seat in the hollow valve body between the vent inlet and the vent outlet, the valve seat of a third area;
- a valve chamber between the valve seat and the vent outlet;
- a cylindrical retainer surrounding the valve seat in the valve chamber, the retainer having a height less than the height of the valve chamber, the retainer defining an axial bore;
- radial flow vents in the cylindrical retainer radially communicating the axial bore to the valve chamber;
- a ball valve element axially movable within the retainer between a rest position on the valve seat and an open position off the valve seat but with at least a portion of the ball valve element retained within the axial bore of the retainer;
- a bleed vent associated with the valve seat within the cylindrical retainer to maintain vapor flow at a first low rate when the ball valve element is seated on the valve seat; wherein,
- the height of the cylindrical retainer is greater than the radius of the ball valve element, the diameter of the axial bore is only slightly greater than the diameter of the ball valve element, the radial flow vents are positioned below the center of the ball valve element when it is in the rest position, and the limit of axial travel of the ball valve element off the valve seat is such as to cause the centerline of the ball to be held within the cylindrical volume.

3. In a vehicle fuel system comprising a fuel tank and a vapor trap connected to the fuel tank to receive fuel vapor, and a ball head valve connected between the fuel tank and the vapor trap to selectively vent fuel vapor from the tank to the trap, the ball head valve comprising a hollow valve body having a vent inlet communicating with the interior of the fuel tank and a vent outlet communicating with the vapor trap, a circular valve seat between the vent inlet and the vent outlet, a valve chamber defined between the valve seat and the vent outlet, a cylindrical retainer surrounding the valve seat in the valve chamber, a ball valve element within the cylindrical retainer movable between a rest position on the valve seat and an open position off the valve seat, radial flow vents in the retainer communicating the bore of the retainer with the valve chamber, and a bleed vent associated with the valve seat to maintain flow from the fuel tank to the valve chamber when the ball valve element is in the rest position on the valve seat, a method for calibrating the ball head valve to achieve two-stage flow with a smooth, low hysteresis transition between low and high flow, comprising the following steps:
- selecting a specified head pressure at which the ball head valve is lifted off the valve seat to the open position resulting in a change from low to high flow;
- selecting a specified weight and diameter for the ball valve element;
- determining the diameter of the valve seat required to lift a ball valve element of the specified weight at the specified head pressure;
- determining the total area of the radial flow vents;
- determining the height of the axial bore based on the diameter of the ball valve element and the diameter of the valve seat;
- determining a diameter for the axial bore slightly larger than the diameter of the ball valve element such that the ball does not spin within the bore during lift off and does not exhibit substantial hysteresis on closing;
- setting the height of the valve chamber to limit the travel height of the ball valve element such that at maximum lift the center line of the ball rises no higher than the height of the cylindrical retainer;
- sizing the vent outlet such that its diameter is greater than that of the valve seat; and
- calibrating the bleed vent to permit vapor flow below the specified head pressure without increasing the head pressure.

4. In a vehicle fuel system including a fuel tank and a vapor trap connected to the fuel tank, and a ball head valve connected between the fuel tank and the vapor trap, the head valve comprising a hollow valve body having a vent inlet communicating with the interior of the fuel tank and a vent outlet communicating with the vapor trap, a valve seat between the vent inlet and the vent outlet, a valve chamber defined by the valve seat and the vent outlet, a cylindrical retainer surrounding the valve seat in a valve chamber, a ball valve element resting on the valve seat within the cylindrical retainer, and a bleed vent associated with the valve seat to permit vapor flow from the tank to the valve chamber when the ball valve element is resting on the seat, a method for providing two-stage flow between the fuel tank and the vapor trap through the ball head valve, comprising the following steps:
- determining the geometry of the cylindrical retainer and the diameter of the valve seat for a ball valve element of given diameter and weight and a specified head pressure such that the bleed vent provides vapor from the fuel tank to the vapor trap at a first vapor flow increase rate within a first low tank pressure range, the ball valve element lifts off the valve seat at the specified head pressure to provide a second vapor flow increase rate much greater than the first vapor flow increase rate in a second pressure range corresponding substantially to the specified head pressure, and a third vapor flow increase rate similar to the first vapor flow increase rate in a third high tank pressure range above the specified head pressure, and a vapor flow decrease rate tracking the third, second and first vapor flow increase rates in reverse with little or no hysteresis as tank pressure descends from the third through the first pressure ranges.

* * * * *

UNITED STATES PATENT AND TRADEMARK OFFICE
CERTIFICATE OF CORRECTION

PATENT NO. : 5,253,668
DATED : October 19, 1993
INVENTOR(S) : Mills

It is certified that error appears in the above-indentified patent and that said Letters Patent is hereby corrected as shown below:

Column 3, line 47, delete "26 are formed" and insert --26 formed--;

Column 3, line 49, delete "Radial" and insert --Although radial--;

Column 3, line 49, delete "also circular as shown - other shape holes can be used." and insert --are shown as circular, it is possible to use non-circular radial vents.--;

Column 4, lines 13-14, delete "and the open bore of retainer 24";

Column 5, line 18, delete "height F of" and insert --height of--;

UNITED STATES PATENT AND TRADEMARK OFFICE
CERTIFICATE OF CORRECTION

PATENT NO. : 5,253,668
DATED : October 19, 1993
INVENTOR(S) : Mills

It is certified that error appears in the above-indentified patent and that said Letters Patent is hereby corrected as shown below:

Column 6, line 21, delete "height F should" and insert --height should--;

Column 6, line 22, delete "line 29 of" and insert --line of--;

Column 6, line 28, delete "affect" and insert --effect--;

Column 6, line 29, delete "F";

Column 7, line 59, delete "volume" and insert --retainer--;

Column 8, line 49, delete "by" and insert --between--;

Column 8, line 51, delete "in a valve" and insert --in the valve--.

Signed and Sealed this

Twenty-first Day of February, 1995

Attest:

*Attesting Officer*

BRUCE LEHMAN

*Commissioner of Patents and Trademarks*